US006934084B2

(12) United States Patent
Pandya

(10) Patent No.: US 6,934,084 B2
(45) Date of Patent: Aug. 23, 2005

(54) THINNER, LIGHTER AND LOWER ABERRATION PRISMS FOR OPHTHALMIC APPLICATIONS

(76) Inventor: Ranjana Pandya, 3 Kaegill La., New Paltz, NY (US) 12561

( * ) Notice: Subject to any disclaimer, the term of this patent is extended or adjusted under 35 U.S.C. 154(b) by 49 days.

(21) Appl. No.: 10/187,638

(22) Filed: Jul. 2, 2002

(65) Prior Publication Data

US 2003/0035214 A1 Feb. 20, 2003

Related U.S. Application Data

(60) Provisional application No. 60/313,534, filed on Aug. 20, 2001.

(51) Int. Cl.[7] .................................................. G02B 5/18
(52) U.S. Cl. ........................ 359/571; 359/831; 351/175
(58) Field of Search ................................. 359/571, 831, 359/565, 566, 837, 615; 351/175, 159, 168

(56) References Cited

U.S. PATENT DOCUMENTS 3,628,854 A * 12/1971 Jampolsky .................. 351/175
4,411,492 A * 10/1983 Bluege ........................ 359/572
5,384,606 A * 1/1995 Koch et al. .................. 351/158
5,625,499 A * 4/1997 Chen ........................... 359/831
6,226,135 B1 * 5/2001 Masui et al. ................. 359/831
6,414,930 B1 * 7/2002 Shiono et al. ........... 369/112.03
6,539,037 B1 * 3/2003 Shio et al. ................ 372/29.02
6,693,745 B1 * 2/2004 Kondis et al. ............... 359/569

* cited by examiner

Primary Examiner—Thong Nguyen
Assistant Examiner—Arnel C. Lavarias

(57) ABSTRACT

Novel optical devices, which are referred to as composite prisms in this document, have been designed, produced and tested. They have the potential to be useful for a number of vision related applications. For high prism diopter (15 prism diopters or more), composite prisms have resulted in thinner, lighter and lower aberration optical devices than the standard ophthalmic prisms currently in use. They also offer significantly better optical quality than the Fresnel press-on prisms which are also used to correct several ophthalmic disorders.

15 Claims, 3 Drawing Sheets

THINNER, LIGHTER AND LOWER ABERRATION PRISMS FOR OPHTHALMIC APPLICATIONS

CROSS-REFERENCE TO RELATED APPLICATIONS

In this non-provisional patent application, the applicant would like to claim the benefit of an earlier provisional patent application No. 60/313,534 filed on Aug. 20, 2001 (8/20/01) with the US Patent and Trademark Office (USPTO). The corresponding provisional patent application contains drawings and a significant part of the present patent application. The applicant has also filed a disclosure document no. 494556, dated Jun. 1, 2001 with the USPTO. The disclosure document contains a brief description of the material in this patent application.

REFERENCE TO A MICROFICHE APPENDIX

Not Applicable.

FEDERALLY SPONSORED RESEARCH OR DEVELOPMENT

Funds from the federally sponsored Small Business Innovation Research (SBIR) program, which were awarded as SBIR phase I grant #1R43 EY10279-01A4 and SBIR phase II grant #2R44 EY 10279-02 were used to develop the ideas and devices mentioned in this invention. However, the awardee organization retains the principal worldwide patent rights to any inventions resulting from these federal grants.

BACKGROUND OF THE INVENTION

Field of Endeavor: This invention relates to optical devices for ophthalmic applications.

The invention in this application is concerned with prisms that are thinner, lighter and have lower aberrations than the currently available ophthalmic prisms for vision applications. In optical systems, when deflection of light is desired, either mirrors or prisms are commonly used. Since mirrors are not transparent and cannot be put in the path of the beam to deflect it, they present a problem in several optical systems. Prisms are better suited for such systems.

Since most vision related devices use a direct viewing system, prisms are extensively used in many ophthalmic applications. Such applications are well known and documented in many books, for example "Clinical Uses of Prisms: A Spectrum of Applications", edited by Susan Cotter, published by Mosby-Year Book, Inc. (1995). Prisms are used in devices such as spectacles to either correct visual disorders or to improve the ability of the patient to perform certain visual tasks. Prisms are particularly useful for people with partial vision or low vision. Many applications of prisms for low vision have been described in the literature and have been summarized in books such as "Primary Low Vision Care", by Rodney Nowakowski, published by Appleton and Lange (1994). Prisms are also used in the diagnosis of many visual disorders. Due to such broad range of applications, a set of prisms with powers up to 50 prism diopters is a standard equipment in the office of practically every ophthalmologist and optometrist. Prism diopter (p.d.) is defined as (the tangent of the angle of deflection)×100.

Several ophthalmic devices use prisms to shift or expand the visual field. For example, in U.S. Pat. 4,779,972, a visual field awareness system is described, where spectacles with appropriately placed prisms are used to increase the visual field of hemianopic patients. Inwave Optics, Inc., markets spectacles with multiple prisms called Field Expanding Channel Lens for patients with peripheral visual field loss. New ophthalmic devices that use prisms to correct or improve the vision continue to emerge. For example, U.S. Pat. No. 6,318,857, shows variable power spectacles which utilize a series of prisms. Similariy in U.S. Pat. No. 5,969,790, a multi prism system is used for image enhancement. Researchers at Harvard Medical School's Schepens Eye Research Institute have recently developed new devices to expand the visual field of visually impaired brain damaged patients (cf. E. Peli et al., Optometry and Vision Science, September 2000), which make use of multiple prisms. Currently several visual disorders are corrected by using ophthalmic refractive prismatic spectacles. High magnification prismatic reading spectacles and spectacles used to correct diplopia, hemianopia and strabismus are some examples.

Although there are numerous possible applications for prisms in ophthalmic devices, the problem is that for most applications, the standard ophthalmic refractive prisms can only be used for low prismatic powers of up to 10–12 p.d. The reason is that for high prism diopters, such prisms become thick and heavy. The use of such prisms in spectacles and other vision related devices (for example spectacle mounted telescopes) becomes particularly difficult. The reason is that spectacles with heavy prisms are uncomfortable to wear and spectacles with thick prisms are impractical to use because they touch the user's eyelashes. For high prism diopters, standard ophthalmic prisms also display poor optical quality due to higher chromatic and monochromatic aberrations. For ophthalmic devices, where high prismatic powers are needed, Fresnel prisms are usually used because they are thin. Fresnel prisms overcome the thickness problem, but present other serious problems, such as a significant reduction in visual acuity and contrast sensitivity (cf. Woo G. C., Campbell F. W. and Ing B in Ophthalmic Physiol. Opt. 6, pp 415–418 (1986)). High refractive index materials can be used to reduce the thickness of the refractive ophthalmic prisms, but such high index materials display higher dispersion. This deteriorates their optical quality drastically, making high index material prisms unacceptable for most vision applications.

Prior to the instant invention, refractive ophthalmic prisms and Fresnel prisms were the only two choices available for correcting vision conditions and these are both impractical or unsatisfactory for high diopter (over 15 prism diopter) prisms. However, prism diopters (p.d.) as high as 40 are needed to correct some visual conditions and prisms up to 50 p.d. are needed for diagnostic purposes.

BRIEF SUMMARY OF THE INVENTION

The instant invention is concerned with prisms that are thinner, lighter and have lower aberrations as compared to standard ophthalmic prisms which are currently being used for several vision related applications.

According to this application, the applicant has invented, designed, produced and tested novel optical devices, which will be referred to as composite prisms from here on in this document. For high prism diopters (15 p.d. and higher prismatic powers), composite prisms are thinner, lighter and offer better optical quality than the currently available standard ophthalmic prisms for vision applications. Composite prisms also offer significantly better optical quality than the Fresnel press-on prisms which are also used to correct several ophthalmic disorders.

According to the invention, the structure of a typical composite prism involves the (a) use of a refractive prism made of a high refractive index glass or plastic material; (b) use of a specific transmission surface relief diffractive structure, namely low blaze angle blazed diffraction grating, to provide additional prismatic power and (c) combination of the high refractive index prism and the low blaze angle blazed grating in such a way that the blazed grating cancels or significantly reduces the chromatic aberration of the refractive prism to produce thinner, lighter and lower aberration prisms as compared to the standard ophthalmic prisms of the same power. Fresnel prisms may be used instead of or in addition to the refractive prisms as the first (part a) component of the composite prisms. Tinted prisms or additional optical filters may be used to enhance the performance of the composite prism or to suit the specific needs of the user.

Using this basic structure, composite prisms in a wide range of prism powers (from 15 p.d. to 50 p.d.) have been fabricated and tested. Such composite prisms have resulted in a dramatic reduction in thickness, coupled with a significant improvement in optical performance as compared to that of the standard ophthalmic prisms. FIG. 1 shows a 23 p.d. composite prism for a 45 mm spectacle lens. FIG. 2 shows an equivalent standard ophthalmic prism of the same prism diopter. The edge thickness of the composite prism is almost half that of the ophthalmic prism. Since ophthalmic prisms are used in spectacles, reduction of the thickness of prisms is critical. Very thick prisms are impractical for use in spectacles because, as stated earlier, they become heavy and touch the eye lashes of the user.

The dramatic reduction in the thickness of composite prisms is also accompanied by a significant improvement in optical performance. This improvement has been demonstrated by measurements with optical instruments as well as tests on human subjects. Visual acuity of an ophthalmic device is usually measured in terms of Snellen acuity, which is related to the number of lines read by a person on a standard Snellen eye chart. In clinical tests involving human subjects, composite prisms showed improvements between 2 to 5 Snellen lines over equivalent standard ophthalmic prisms and Fresnel prisms depending on the power and type of the prism. This is considered a significant improvement.

DETAILED DESCRIPTION OF THE INVENTION

As previously discussed, the instant invention is concerned with optical devices called composite prisms that are thinner, lighter and have lower aberrations as compared to standard ophthalmic prisms. While these qualities are particularly useful for vision applications, thick and heavy prisms being difficult to use in spectacles, composite prisms would also be useful in other optical systems where these qualities are desired.

One of the primary objectives is to make the composite prisms thinner than the standard ophthalmic prisms. In a composite prism, one way of achieving this objective is through the use of a high refractive index material. Standard ophthalmic prisms use either acrylic plastic (refractive index=1.49) or crown glass (refractive index=1.51) as the materials of choice because both these materials have high Abbe numbers (in the range of 50 or more). Since Abbe number is the reciprocal of dispersive power, these high Abbe numbers translate into low dispersive powers or less color splitting, which is highly desirable in vision applications. Despite the fact that use of higher refractive index materials would result in thinner prisms, the standard ophthalmic prisms rarely use high index materials. The reason is that these materials have significantly lower Abbe values (in the range of 25–40) and thus show significantly higher chromatic aberration. This results in noticeable color splitting of an image, making high index materials impractical for standard ophthalmic prisms.

Composite prisms, however, can make use of high refractive index materials to significantly reduce their thickness. Unlike a standard ophthalmic prism, the optical quality of a composite prism does not deteriorate due to the undesirable aberrations introduced by the high refractive index refractive prism. This is due to the fact that composite prisms have additional optical components to reduce or cancel these aberrations. Hence, for composite prisms, high refractive index materials such as polycarbonate (refractive index= 1.59), high index polyurethane (refractive index=1.66) made by Seiko company, high index plastic (refractive index= 1.71) made by Hoya company, High-Lite glass (refractive index=1.7) made by Schott company and 1.8 glass (refractive index=1.8), made by Ohara as well as Schott, can all be used. All of the plastics and glasses mentioned above have been approved by Food and Drug Administration (FDA) for use in spectacles and other vision related devices. The high index refractive prism component of a composite prism can be made by several methods such as the standard grinding and polishing method and by various molding techniques which are well known in the optics industry.

Figure 3:
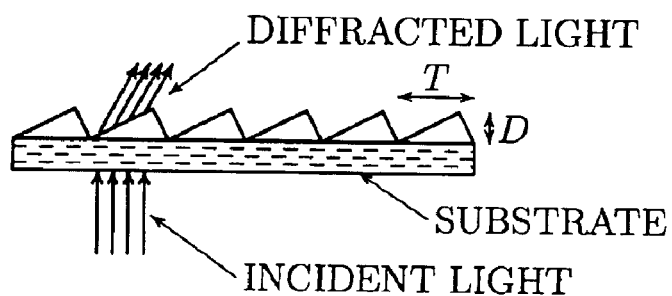
FIG. 3 shows the structure of a typical surface relief diffractive structure used in composite prisms. $D=1.1\times10^{-6}$ meters. $T=21.7\times10^{-6}$ meters.

The second component of composite prisms consists of a specific surface relief diffractive structure, namely a low blaze angle, blazed grating. Although the majority of the prism power in a composite prism comes from the high refractive index refractive prism mentioned above, the diffractive structure also contributes additional prism power. A typical diffractive structure is shown in FIG. 3. The diffractive element in FIG. 3 will produce a deflection equivalent to that of the refractive prism of a 3 degree prism angle. However, for a typical pair of glasses, the edge thickness D would be reduced by a factor of 1000 or more as compared to the edge thickness of the equivalent refractive prism. Although such a thin diffractive element appears appealing, it cannot be used as a stand alone device for most vision applications, with the exception of those where a limited band width is used. The reason is that the chromatic aberration of such a diffractive element is very high. In fact, the chromatic aberration of the diffractive element shown in FIG. 3 is roughly comparable to that displayed by a 25 p.d. high index refractive prism, which would be considered unacceptable for most vision applications. However, such a diffractive element can be very useful for a number of ophthalmic applications when it is used with high index refractive prisms or Fresnel prisms, as will be discussed later in this section.

Figure 4:
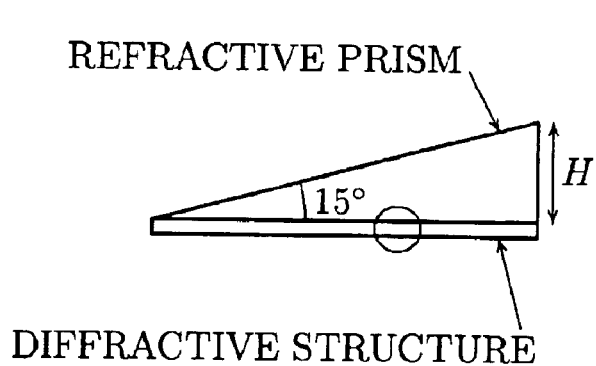
FIG. 4 shows the configuration of a refractive prism and a diffractive structure used to make a typical composite prism. The base of the refractive prism is 45 mm and the edge thickness H is 12 mm. A circle surrounds a small part of the prism base surface with the diffractive structure replicated on it.

In addition to contributing to the prism power of the composite prism, an important and useful purpose of the diffractive structure is to cancel or reduce the aberrations introduced by the high index refractive prism. One of the most disturbing aberrations is chromatic aberration which severely deteriorates the optical quality. However, the chromatic aberration displayed by the diffractive structure is in a direction opposite to that of the refractive prism. Hence, a diffractive structure (similar to the one shown in FIG. 3), fabricated with appropriate parameters and combined with a high index refractive prism, can not only provide a part of the prismatic power but can also reduce or eliminate the chromatic aberration of the refractive prism. Such a composite prism can thus result in a significantly thinner and better device than a standard refractive prism. FIG. 4 shows the configuration of such a combination of high index refractive prism and a diffractive structure.

Composite prisms typically use a combination of high index refractive prism and a diffractive surface relief structure. This combination can be created in the following two ways. (1) Diffractive surface relief structures can be replicated directly on the high index refractive prism as shown in FIG. 4. (2) Diffractive structures can also be replicated on a separate, preferably thin, transparent substrate, which can then be combined with the high index refractive prisms. For example, in the case of spectacles containing refractive prisms along with other refractive corrections, the separate substrate containing the diffractive structures may be glued, held by the spectacle frame or used as clip-ons to mention a few options.

In order to produce composite prisms which can cover the range of 15 to 50 p.d., a range typically used in high power prismatic ophthalmic application, it is necessary to use 3 different low angle blazed gratings. A blazed grating with a blaze angle of 2 degrees, works well to produce composite prisms in the 13–25 p.d. range. As an example, in a composite prism with a total prismatic power of 20 p.d., approximately 18 p.d. comes from the high index refractive prism and about 2 p.d. from the blazed grating. Similarly, a 3 degree blaze angle grating is suitable for composite prisms in the 25–38 p.d. range, and a 4 degree blaze angle blazed grating is appropriate to produce composite prisms in the 38–50 p.d. range of prismatic powers. The numbers for these blaze angles assume that the low angle blaze gratings are transmission blazed gratings and that they are blazed in the first order at a wavelength of about 560 nm. Furthermore, it is assumed that the refractive index of the diffractive structure replication epoxy is approximately 1.52 and the Abbe number of the refractive prism is in the range of 25–40. The numbers for the blaze angles need to be adjusted somewhat depending on the refractive index of the replication epoxy, the Abbe number, and the refractive index of the high index refractive prism.

Composite prisms can also be made using Fresnel prisms instead of or in addition to high index refractive prisms. For example, in a 40 p.d composite prism, 25 p.d. power could come from a high index refractive prism, 12 p.d. from a Fresnel prism and another 3 p.d. from the diffractive structure. Alternatively, Fresnel prism could provide the larger part and refractive prism smaller, or even no part of the prismatic power, depending on the thickness and optical quality requirements of the final device. In all of these cases, the majority of the power is provided by Fresnel and refractive prisms. The diffractive structure also adds some prismatic power, but more importantly it is used to reduce the aberrations and thickness of the prisms. This reduces the thickness and significantly improves the optical quality of the composite prism as compared to that of a standard ophthalmic prism of the same power.

A typical procedure for obtaining the diffractive structure shown in FIG. 3 is as follows: The desired surface thickness variation is obtained by removing or etching away parts of the surface of a grating master using one of several methods such as the diamond turning method, electron beam lithography or photolithography techniques. The master is then used to replicate the diffractive structure on a suitable transparent substrate using well established replication technology. A typical replication process uses ultra violet or thermally curable epoxy, a release layer and a protective layer. This process is well documented. Other methods such as hot embossing, injection and compression molding, and optical stamping can also be used to produce such diffractive structures. These techniques are well known in the optics industry.

Since diffractive structures have a surface variation of the order of 1 micron, and they can be either replicated directly on the refractive prism or replicated on a substrate as thin as 0.5 mm, the diffractive structure part does not add any significant thickness to the composite prism. The surface of the diffractive structure, however, is delicate and needs to be protected from dirt, fingerprints, oils etc. This can be done by covering the sensitive surface with a thin transparent cover plate. Such a cover plate can be glued by applying an optical adhesive on the perimeter of the cover plate. Alternatively, an optical filter can also be used as a cover plate. If the diffractive structure has been replicated on a separate substrate then applying an adhesive on the perimeter or the edge of the substrate, and sticking it to the prism in such a way that the sensitive diffractive surface faces the prism, presents another option.

Unlike a prism, a diffraction grating splits the incoming light ray of every wavelength into many different directions or different orders. The particular class of diffraction gratings used in the present invention, namely low blaze angle blazed gratings, are specifically designed to concentrate most of the diffracted light in a single direction or a single order. However, the concentration of light in a single order is not constant over the entire visible spectrum. Grating parameters can be optimized to suit a specific application. For example, a blazed grating designed to work efficiently in the yellow-orange part of the spectrum will not work well for the blue end of the spectrum. In some cases, this can result in a poor image quality or multiple images. In these situations, it may be necessary to limit the band width in order to optimize the optical performance of the composite prisms. This can be done by using appropriate optical filters or tinted materials. In order to get the best performance in a broad range of the visible spectrum, a low angle blazed grating with its highest efficiency at a blaze wavelength of about 560 nm is suitable for making composite prisms. The efficiency of the grating can be optimized by making the top angle of the grating grooves as close to 90 degrees as possible. Additional information about the fabrication and wavelength dependence of gratings can be obtained from reference books, such as "Diffraction Gratings and Applications" by E. G. Lowen and E. Popov, Published by Marcel Dekker, Inc.(1997).

The ideas and methods presented in this section have been put into practice to produce composite prisms in the range of 15 p.d. to 50 p.d. prismatic powers. For these prisms, the diffractive structures were replicated on thin transparent glass or plastic substrates. The thickness of the substrates was in the range of 0.5 mm to 2 mm. Some of the diffractive structures were made using the epoxy replication method and others were made using molding techniques on plastic substrates. A number of different materials such as polycarbonate, high index polyurethane 1.66 and 1.7 High-Lite glass were used to make the refractive prisms. These high index refractive prisms, thin substrates with appropriate blazed grating, and in some cases appropriate optical filters were glued together with optical adhesives to make single unit composite prisms. Such composite prisms were then used to make and test other ophthalmic devices such as high magnification prismatic reading spectacles and high power, wide angle telescopic spectacles. Composite prisms were also made using Fresnel Prisms in addition to the refractive prisms or in place of refractive prisms. In both these cases, the diffractive structures were used to reduce the aberrations of the refractive and Fresnel prisms to improve the optical performance of the composite prisms.

The optical performance of composite prisms of various prismatic powers was measured and compared with other types of prisms that are currently used for ophthalmic applications. For example, a 40 p.d. composite prism when compared with standard ophthalmic prism and Fresnel prism showed a significant improvement in visual acuity. In a clinical study involving unbiased human subjects, the visual acuity improvement was almost 3 Snellen lines over equivalent standard ophthalmic prism and almost 5 Snellen lines over an equivalent Fresnel prism. This is considered a dramatic improvement in optical performance.

Preferred embodiments of the invention will now be described with reference to the figures of the drawing and the following examples.

EXAMPLE 1

Figure 1:
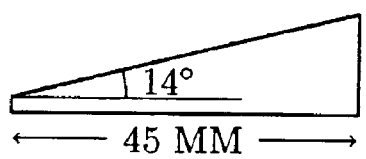
FIG. 1 shows a 23 prism diopter composite prism for a 45 mm spectacle lens.

A composite prism of 23 p.d. was made and tested. This prism was similar to the prism shown in FIG. 1. The high index refractive prism component of the composite prism was made using the glass SFL-6 with a refractive index of 1.8 and Abbe number of 26. This glass was manufactured by the Ohara company. A refractive SFL-6 prism with a prism angle of 14 degrees produced about 21 p.d. prismatic power. A low blaze angle blazed grating with a blaze angle of 2.3 degree and a groove density of 35 grooves/mm produced additional prismatic power of about 2 p.d., thus making the total prism power of the refractive and diffractive components slightly over 23 p.d. It is important to note that a standard ophthalmic acrylic prism of similar thickness would have produced only 13 p.d. prismatic power. The diffractive structure was replicated from a grating master using thermally cured epoxy on a 1.5 mm thick, transparent BK-7 glass substrate, and was similar to that shown in FIG. 3. The grating master was produced by using a ruling engine with a diamond tool. The dimensions of both the refractive prism and the diffractive substrate were 38 mm round so they could fit in the standard ophthalmic trial frames. The blazed grating was designed to produce its highest efficiency at a wavelength of 570 nm. A light orange, long pass, filter with a cut off wavelength of 520 nm was used to optimize the performance of the composite prism. All three components, the high index refractive prism, the separate transparent substrate with the diffractive structure and the light orange colored long pass filter were stuck together with an optical adhesive. The substrate with the diffractive structure was sandwiched between the refractive prism and the optical filter. This single unit composite prism was then loaded in a standard ophthalmic trial frame and tested by human subjects in a clinical study.

Figure 2:
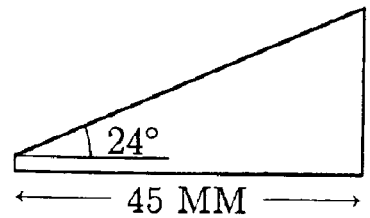
FIG. 2 shows an equivalent standard ophthalmic prism of 23 prism diopter for a 45 mm spectacle lens. The edge thickness of the standard prism is almost twice that of the composite prism in FIG. 1.

The optical performance of the composite prisms was tested by the staff members of a well known College of Optometry. In this clinical study, unbiased human subjects compared the performance of composite prisms, standard ophthalmic prisms and Fresnel prisms. Commercially available standard ophthalmic prisms and ophthalmic press-on Fresnel prisms of similar prismatic powers as the composite prism were used for comparison. The standard ophthalmic prisms were made of CR-39 acrylic plastic and were similar to the one shown in FIG. 2. Optometric techniques were used to measure the optical performance of these three types of prisms. One such optometric test called Keystone Usable Acuity was used to test the performance of 23 p.d. prisms. All three types of prisms were tested for both eyes (OU), the right eye (OD) and the left eye (OS). For this optometric test, score of <6 denote "low usable vision". Only the composite prisms exceeded the criterion score of 6 for usable vision for OU, OS and OD tests. The other two types did not. Another optometric test, which measures Keystone Stereopsis level, was also used to test the performance of the three types of prisms. For this test, score <9 indicates poor stereopsis. Composite prisms easily exceeded the stereopsis criterion of 9 but the other types of prisms did not. These results clearly show the superior optical quality of composite prisms as compared to that of standard ophthalmic and Fresnel prisms.

EXAMPLE 2

Figure 5:
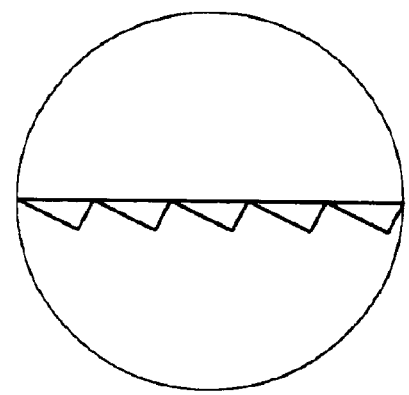
FIG. 5 shows the enlarged view of the elements in this circle to show the orientation of the features of the diffractive structure. The depth and width of the diffractive structure grooves in FIG. 5 are similar to those shown in FIG. 3.
Figure 6:
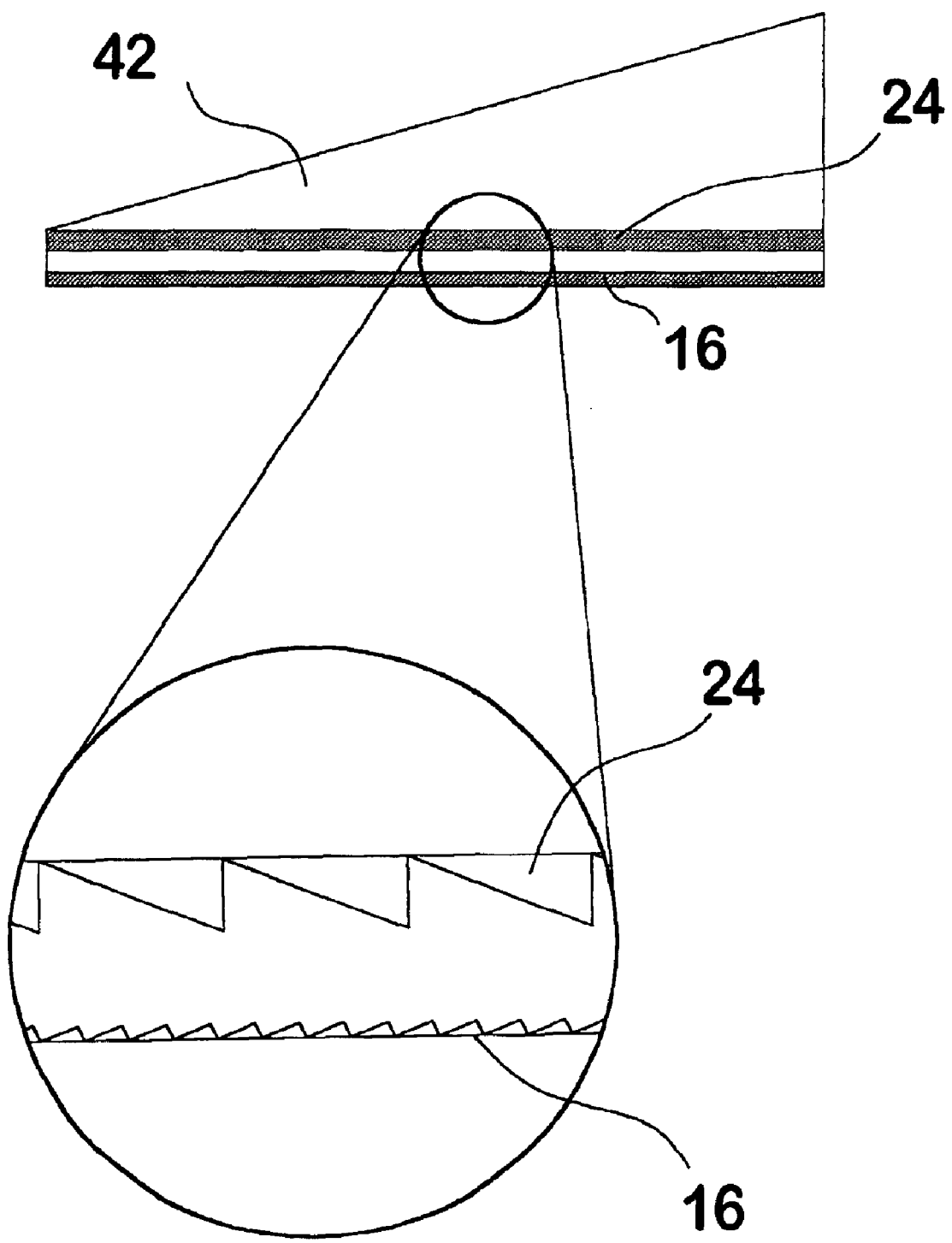
FIG. 6 shows a refractive prism 42, a Fresnel prism 24 and a diffractive structure 16 used to make a composite prism. The enlarged view shows the orientation of the Fresnel prism and the diffractive structure.
Figure 7:
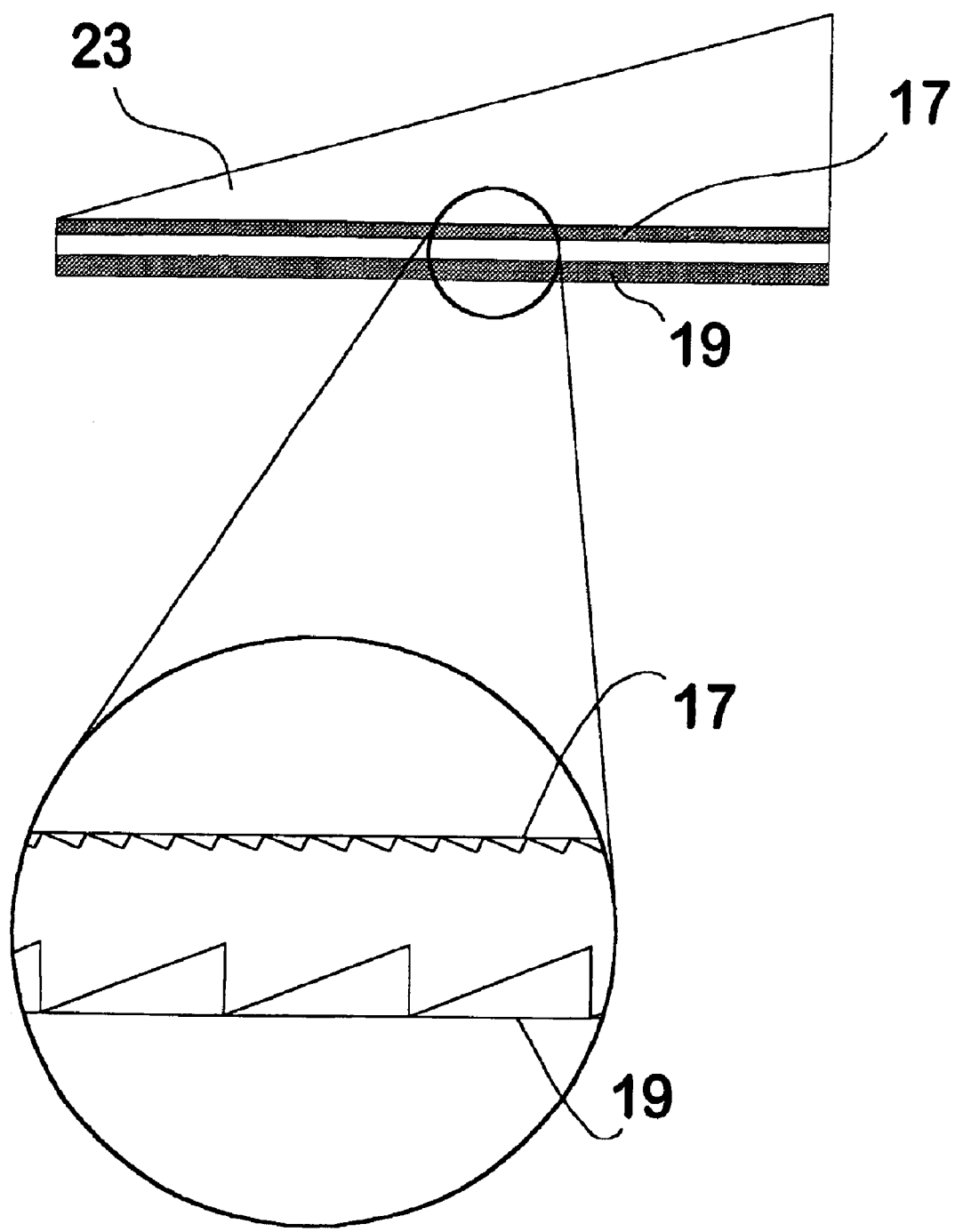
FIG. 7 shows a refractive prism 23, a diffractive structure 17 and a Fresnel prism 19 used to make a composite prism. The enlarged view shows the orientation of the diffractive structure and the Fresnel prism.

Instead of replicating the diffractive structure on a separate transparent substrate as was the case in example 1, the diffractive structure in this example was directly replicated onto the high index refractive prism. This method avoids the use of a separate substrate, thus reducing the thickness of the composite prism to the least possible. Additional reflections arising from the use of another surface are also eliminated. For this example, a high index prism with a prism angle of 15 degrees was made using High-Lite glass. This glass has a refractive index of 1.7 and is manufactured by the Schott company. A blazed grating with a blaze angle of 2.3 degree, a groove density of 35 grooves/mm and with its highest efficiency at a wavelength of 570 nm, was then replicated on the base face of the high index refractive prism as shown in FIG. 4. The orientation of diffractive structure grooves is shown in FIG. 5. The total prismatic power of the composite prism was about 22 p.d. An orange, long pass, filter with a cutoff wavelength of 560 nm was used to optimize the optical performance of this composite prism. With this combination, results were similar to those obtained with the composite prism described in example 1.

For both examples 1 and 2 we used diffractive structures, which have their highest efficiency in the yellow-orange part of the visible spectrum. This is due to the fact that many low vision patients develop glare sensitivity in the blue part of the visible spectrum. However, depending on the specific application, the diffractive structures can be designed to work efficiently in other parts of the visible spectrum (for example green) as well. Although in order to produce composite prisms, we have replicated and used diffractive structures on flat substrates, they may be replicated on a surface with curvature (both concave and convex) as well. This situation may arise when composite prisms are combined with other ophthalmic corrections; for example, corrections for myopia. We have obtained similar results as those described in examples 1 and 2 with refractive prisms made with other high index glass and plastic materials and for other prismatic powers as well.

While the present invention has been described with reference to the particular embodiments thereof, it will be understood that numerous modifications may be made by those skilled in the art without actually departing from the scope of the invention.

What is claimed is:

1. A composite prism functioning as an ophthalmic prism for diagnosing and correcting visual disorders, operating as an exclusively transmission device, having prismatic power in the range of fifteen prism diopters to fifty prism diopters, operating and being optically transmissive over a bandwidth of at least 150 nm within the visible spectrum, said spectrum being defined as the spectral band of wavelengths between 380 mm and 780 mm, such composite prism comprising:

a transparent refractive prismatic component having an entrance face, an exit face and a refractive index of at least 1.49;

a blazed transmission diffraction grating having a uniform grating period and a low blaze angle;

means for retaining the diffraction grating against one of the entrance and exit faces of the transparent refractive prismatic component wherein the diffraction grating is oriented in such a manner that the prismatic power of the composite prism is approximately the sum of the prismatic powers of the transparent refractive prismatic component and the diffraction grating.

2. A composite prism according to claim 1 wherein the transparent refractive prismatic component is a refractive prism.

3. A composite prism according to claim 1 wherein the transparent refractive prismatic component is a Fresnel prism.

4. A composite prism according to claim 1 wherein the diffraction grating is blazed in the first order and has a blaze wavelength of 560 nm and a blaze angle of two degrees to produce prismatic powers in the range of fifteen to twenty five prism diopters.

5. A composite prism according to claim 1 wherein the diffraction grating is blazed in the first order and has a blaze wavelength of 560 nm and a blaze angle of three degrees to produce prismatic powers in the range of twenty five to thirty eight prism diopters.

6. A composite prism according to claim 1 wherein the diffraction grating is blazed in the first order and has a blaze wavelength of 560 nm and a blaze angle of four degrees to produce prismatic powers in the range of thirty eight to fifty prism diopters.

7. A composite prism according to claim 1 wherein the diffraction grating is blazed in the first order and has a blaze wavelength of 560 nm and a blaze angle in the range of two to four degrees to produce prismatic powers in the range of fifteen prism diopters to fifty prism diopters.

8. A composite prism according to claim 1 wherein the transparent refractive prismatic component is a refractive prism made of polycarbonate having a refractive index of 1.59.

9. A composite prism according to claim 1 wherein the transparent refractive prismatic component is a refractive prism made of polyurethane having a refractive index of 1.66.

10. A composite prism according to claim 1 wherein the transparent refractive prismatic component is a refractive prism made of glass having a refractive index of 1.8.

11. A composite prism according to claim 1 wherein the transparent refractive prismatic component is a Fresnel prism having a refractive index of 1.49.

12. A composite prism according to claim 1 wherein the transparent refractive prismatic component is a refractive prism and further including a transparent Fresnel prism, located between the refractive prism and the diffraction grating, and further including means for retaining the Fresnel prism against one of the entrance and exit faces of the refractive prism and retaining the diffraction grating against the Fresnel prism in such a manner that the prismatic power of the composite prism is approximately the sum of the prismatic powers of the refractive prism, the Fresnel prism and the diffraction grating.

13. A composite prism functioning as an ophthalmic prism for diagnosing and correcting visual disorders, operating as an exclusively transmission device, having prismatic power in the range of fifteen prism diopters to fifty prism diopters, operating and being optically transmissive over a bandwidth of at least 150 nm within the visible spectrum, said spectrum being defined as the spectral band of wavelengths between 380 mm and 780 mm, such composite prism comprising:

a transparent refractive prism having an entrance face, an exit face and a refractive index in the range of 1.59 to 1.8;

a transparent Fresnel prism having an entrance face, an exit face and a refractive index of 1.49;

a blazed transmission diffraction grating having a uniform grating period and a blaze angle in the range of two to four degrees; and means for securing the diffraction grating to one of the entrance and exit faces of the refractive prism and securing the diffraction grating to one of the entrance and exit faces of the Fresnel prism such that the grating is located between the refractive prism and the Fresnel prism and the prismatic power of the composite prism is approximately the sum of the prismatic powers of the refractive prism, the diffraction grating and the Fresnel prism.

14. A composite prism according to claim 13 to be worn with spectacles and wherein the means for securing the diffraction grating to the refractive prism and the diffraction grating to the Fresnel prism is the frame of the spectacles.

15. A composite prism according to claim 13 wherein the means for securing the diffraction grating to the refractive prism and the diffraction grating to the Fresnel prism is an optical adhesive.

* * * * *